United States Patent
Isaji et al.

(10) Patent No.: US 11,256,056 B2
(45) Date of Patent: Feb. 22, 2022

(54) METHOD FOR MANUFACTURING OPTICAL FIBER RIBBON, OPTICAL FIBER RIBBON, AND OPTICAL CABLE

(71) Applicant: FUJIKURA LTD., Tokyo (JP)

(72) Inventors: Mizuki Isaji, Chiba (JP); Soichiro Kaneko, Chiba (JP); Ken Osato, Chiba (JP)

(73) Assignee: Fujikura Ltd., Tokyo (JP)

( * ) Notice: Subject to any disclaimer, the term of this patent is extended or adjusted under 35 U.S.C. 154(b) by 824 days.

(21) Appl. No.: 16/078,586

(22) PCT Filed: Nov. 8, 2016

(86) PCT No.: PCT/JP2016/083012
§ 371 (c)(1),
(2) Date: Aug. 21, 2018

(87) PCT Pub. No.: WO2017/175414
PCT Pub. Date: Oct. 12, 2017

(65) Prior Publication Data
US 2021/0191061 A1    Jun. 24, 2021

(30) Foreign Application Priority Data

Apr. 8, 2016  (JP) ............................. JP2016-078161

(51) Int. Cl.
*G02B 6/44* (2006.01)
*C03C 25/1065* (2018.01)
*C03C 25/326* (2018.01)

(52) U.S. Cl.
CPC ........ *G02B 6/4482* (2013.01); *C03C 25/1065* (2013.01); *C03C 25/326* (2013.01); *G02B 6/448* (2013.01)

(58) Field of Classification Search
CPC .. G02B 6/4482; G02B 6/448; C03C 25/1065; C03C 25/326
See application file for complete search history.

(56) References Cited

U.S. PATENT DOCUMENTS 5,330,786 A * 7/1994 Nonaka .................... C03C 25/12
427/163.2
5,761,363 A * 6/1998 Mills .................... G02B 6/4403
385/114

(Continued)

FOREIGN PATENT DOCUMENTS

EP      0501339 A1    9/1992
JP      H04-268521 A  9/1992

(Continued)

OTHER PUBLICATIONS

Bach, Mathias, Near Infrared Laser Sensor System for in-Line Detection of Conversion in UV-Cured Polymer Coatings, Dissertation, Karlsruher Institut für Technologie (KIT) Fakultät für Elektrotechnik und Informationstechnik, 2012 (Year: 2012).*

(Continued)

*Primary Examiner* — Peter Radkowski
(74) *Attorney, Agent, or Firm* — Osha Bergman Watanabe & Burton LLP (57) ABSTRACT

A method for manufacturing an optical fiber ribbon includes: forming a colored layer on to each of a plurality of optical fibers and forming an optical fiber ribbon by curing a connecting material applied to a surface of the colored layer of each of the optical fibers to form connection parts that connect adjacent ones of the optical fibers. Forming the colored layer further includes: applying a coloring agent to the optical fibers and curing the coloring agent such that uncured resin remains on the surface of the colored layer. Forming the optical fiber ribbon further includes: applying the connecting material to the surface with the uncured resin (Continued)

and curing the connecting material and the uncured resin on the surface of the colored layer.

13 Claims, 8 Drawing Sheets

(56) References Cited

U.S. PATENT DOCUMENTS

| | | | | |
|---|---|---|---|---|
| 6,035,088 | A * | 3/2000 | Chandraiah | G02B 6/4403 156/714 |
| 6,134,364 | A * | 10/2000 | DeFabritis | G02B 6/4403 385/114 |
| 6,236,790 | B1 * | 5/2001 | Okada | G02B 6/448 385/102 |
| 8,470,213 | B2 * | 6/2013 | Okada | G02B 6/4483 264/1.28 |
| 8,548,294 | B2 * | 10/2013 | Toge | G02B 6/441 385/114 |
| 9,110,265 | B2 * | 8/2015 | Wells | G02B 6/4403 |
| 2004/0022510 | A1 * | 2/2004 | Suzuki | G02B 6/4403 385/128 |
| 2004/0115436 | A1 * | 6/2004 | Komiya | C03C 25/1065 428/411.1 |
| 2004/0170364 | A1 * | 9/2004 | Chiasson | G02B 6/4404 385/114 |
| 2005/0226573 | A1 * | 10/2005 | Okuno | G02B 6/02004 385/114 |
| 2007/0191505 | A1 * | 8/2007 | Takahashi | C08G 18/672 522/178 |
| 2008/0254288 | A1 * | 10/2008 | Yamaguchi | C08G 18/12 428/375 |
| 2013/0279866 | A1 * | 10/2013 | Wells | G02B 6/4403 385/114 |

FOREIGN PATENT DOCUMENTS

| | | |
|---|---|---|
| JP | H11-302039 A | 11/1999 |
| JP | H11-311729 A | 11/1999 |
| JP | 2000-241682 A | 9/2000 |
| JP | 2002-341209 A | 11/2002 |
| JP | 2003-232972 A | 8/2003 |
| JP | 2005-350310 A | 12/2005 |
| JP | 4143651 B2 | 9/2008 |
| JP | 4619424 B2 | 1/2011 |
| JP | 2011-085844 A | 4/2011 |
| JP | 2012-108331 A | 6/2012 |
| JP | 5260940 B2 | 8/2013 |
| JP | 2013-182146 A | 9/2013 |
| WO | 2009075660 A1 | 6/2009 |
| WO | 2011044031 A1 | 4/2011 |
| WO | 2016/017060 A1 | 2/2016 |

OTHER PUBLICATIONS

Office Action issued in corresponding Japanese Patent Application No. 2016-567100 dated Jan. 31, 2017, with translation (9 pages).
Office Action issued in corresponding European Application No. 16897966.4, dated Oct. 5, 2020 (6 pages).

* cited by examiner

FIG. 4B (REFERENCE)

FIG. 4C (PRESENT EMBODIMENT)

FIG. 8A (SECOND EMBODIMENT)

FIG. 8B (THIRD EMBODIMENT)

FIG. 8C (FOURTH EMBODIMENT)

METHOD FOR MANUFACTURING OPTICAL FIBER RIBBON, OPTICAL FIBER RIBBON, AND OPTICAL CABLE

TECHNICAL FIELD

The present invention relates to a method for manufacturing an optical fiber ribbon, an optical fiber ribbon, and an optical cable.

BACKGROUND

Patent Literatures 1 and 2 disclose an optical fiber ribbon (optical fiber ribbon with discontinuous connections) having 3 or more optical fibers arranged side by side and connected at separate portions axially to each other. Patent Literature 3 discloses an optical cable (loose-tube-type optical cable) in which a tube is filled with gel as a filler material (waterproof material).

PATENT LITERATURE

Patent Literature 1: Japanese Patent No. 4143651
Patent Literature 2: Japanese Patent No. 4619424
Patent Literature 3: Japanese Patent No. 5260940

When taking out an optical fiber ribbon from a loose-tube-type optical cable, filler material (gel and the like) attached to the periphery of optical fibers needs to be wiped off. In the case of an optical fiber ribbon with discontinuous connections, however, when wiping off the filler material attached to the optical fiber ribbon, there is a possibility that connection parts that connect the optical fibers are destroyed, and that the optical fiber ribbon comes apart into single optical fibers.

SUMMARY

One or more embodiments of the present invention suppress destruction in the connection parts.

One or more embodiments of the present invention provide a method for manufacturing an optical fiber ribbon including:
colored layer forming to form a colored layer to each of a plurality of optical fibers; and
ribbon forming to form an optical fiber ribbon by curing a connecting material applied to a surface of the colored layer of each of the optical fibers to form connection parts that connect adjacent ones of the optical fibers,
the colored layer forming comprising,
applying a coloring agent to the optical fibers, and
forming the colored layer by curing the coloring agent such that uncured resin remains on the surface, and
the ribbon forming comprising,
applying the connecting material to the surface of the colored layer on which the uncured resin remains, and
curing the connecting material and the uncured resin on the surface of the colored layer.

Other features of one or more embodiments are made clear by the following description and the drawings.

According to one or more embodiments, connection parts can be suppressed from being destroyed.

BRIEF DESCRIPTION OF DRAWINGS

FIG. 4B and FIG. 4C are cross-sectional views of a connection part 12 between two adjacent optical fibers 11 of an optical fiber ribbon 10 with discontinuous connections.

DETAILED DESCRIPTION

At least the following matters are disclosed in the following description and the drawings.

A method for manufacturing an optical fiber ribbon will become clear, including:
colored layer forming to form a colored layer to each of a plurality of optical fibers; and
ribbon forming to form an optical fiber ribbon by curing a connecting material applied to a surface of the colored layer of each of the optical fibers to form connection parts that connect adjacent ones of the optical fibers,
the colored layer forming comprising,
applying a coloring agent to the optical fibers, and
forming the colored layer by curing the coloring agent such that uncured resin remains on the surface, and
the ribbon forming comprising,
applying the connecting material to the surface of the colored layer on which the uncured resin remains, and
curing the connecting material and the uncured resin on the surface of the colored layer. According to this method for manufacturing such an optical fiber ribbon, destruction in the connection parts can be suppressed.

The colored layer forming includes: applying the coloring agent made of radical polymerizable ultraviolet cure resin to the optical fibers and forming the colored layer by irradiating ultraviolet light to the coloring agent while making the uncured resin remain on the surface due to oxygen inhibition. The ribbon forming includes: applying the connecting material made of radical polymerizable ultraviolet cure resin to the surface of the colored layer on which the uncured resin remains and by irradiating ultraviolet light to the connecting material, curing the connecting material and the uncured resin on the surface of the colored layer. In this way, the uncured resin can be made to remain on the surface and the inside can be cured when forming the colored layer, and thus manufacturing the optical fibers becomes easy.

The ribbon forming includes: applying the connecting material to an entire circumferential surface of the optical fibers each formed with the colored layer and by irradiating ultraviolet light to the connecting material, curing the connecting material applied to the entire circumference of the optical fibers and the uncured resin on the surface of the colored layer. In this way, it is possible to suppress the uncured resin from remaining in the optical fiber ribbon that has been manufactured.

The ribbon forming includes: applying the connecting material between the optical fibers and on the entire circumferential surface of the optical fibers each formed with the colored layer, removing a part of the connecting material applied between the optical fibers while making the connecting material applied between the optical fibers remain, and forming the connection parts at discontinuous parts by irradiating ultraviolet light to the connecting material and curing the connecting material. In this way, applying the connecting material to the entire circumference of the optical fiber and intermittently forming the connection parts can be easily achieved.

The colored layer forming includes: in an atmosphere with oxygen concentration of 0.10% to 1.0%, while making the uncured resin remain on the surface due to oxygen inhibition, irradiating the coloring agent with ultraviolet light to form the colored layer. In this way, destruction in the connection parts can be suppressed.

When peak intensity of a band of a double bond of a photopolymerization reaction when measuring a surface of the colored layer with infrared absorption spectrum is A, the peak intensity when the coloring agent is uncured is A0, the peak intensity when the coloring agent is cured the most is A1, and a degree of cure of a surface of the colored layer is represented by degree of cure(%)={(A1−A)/(A0−A1)}× 100, the colored layer is formed such that the degree of cure is 60% to 90%. In this way, destruction in the connection parts can be suppressed.

A Young's modulus of the connecting material is 10 to 300 MPa and a breaking strength of the connecting material is 10 to 30 MPa. In this way, the optical fibers can be suppressed from being damaged when individually separating the optical fibers of the optical fiber ribbon.

A thickness of the connection part is equal to or greater than 150 μm. In this way, destruction in the connection parts can be suppressed.

An optical fiber ribbon will become clear, including: a plurality of optical fibers each having a colored layer, the plurality of optical fibers being arranged side by side; and connection parts each connecting two fibers of the optical fibers adjacent to each other, wherein the colored layer is formed by curing a coloring agent such that uncured resin remains on a surface, a connecting material is applied to a surface of the colored layer with the uncured resin remaining, and the connection parts are formed by curing the connecting material, and the uncured resin on the surface of the colored layer is cured. According to such an optical fiber ribbon, destruction in the connection parts can be suppressed.

An optical cable will become clear, including:
a plurality of optical fibers each having a colored layer and arranged side by side, an optical fiber ribbon having connection parts that connect two fibers of the optical fibers adjacent to each other;

a tube that houses the optical fiber ribbon; and
a filler material filling the tube, wherein
the colored layer is formed by curing a coloring agent such that uncured resin remains on a surface,
a connecting material is applied on a surface of the colored layer on which the uncured resin remains, and
the connecting material is cured to form the connection parts, and the uncured resin on the surface of the colored layer is cured. With such an optical cable, destruction in the connection parts can be suppressed when wiping off the filler material adhered to the optical fiber ribbon.

Structure of Optical Cable 1

Figure 1A:
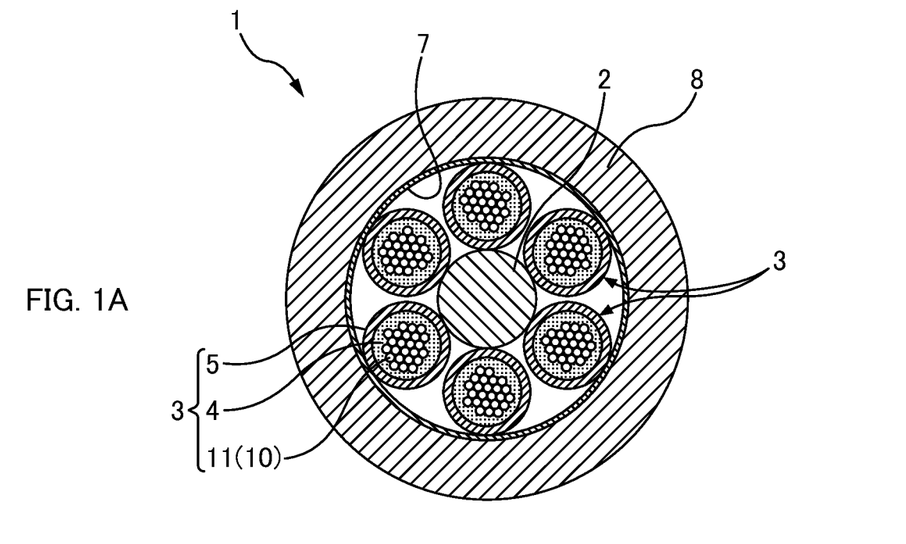
FIG. 1A is a cross-sectional view of a loose-tube-type optical cable 1 according to one or more embodiments.

FIG. 1A is a cross-sectional view of a loose-tube-type optical cable 1 according to one or more embodiments. This loose-tube-type optical cable 1 includes a tension member 2 (tensile member), a plurality of loose tubes 3, and a sheath 8. A plurality of loose tubes 3 are gathered around the tension member 2. The plurality of loose tubes 3 are gathered by being twisted (wound) around the periphery of the tension member 2 either helically in one direction, or in an S-Z configuration wherein the helical direction is inverted at certain intervals. The outer periphery of the plurality of loose tubes 3, which have been gathered around the tension member 2, is covered with a wrapping tape 7, a sheath material is extruded to the outer periphery of the wrapping tape 7 to form the sheath 8, to thereby manufacture the loose-tube-type optical cable 1 as shown in FIG. 1A.

Figure 1B:
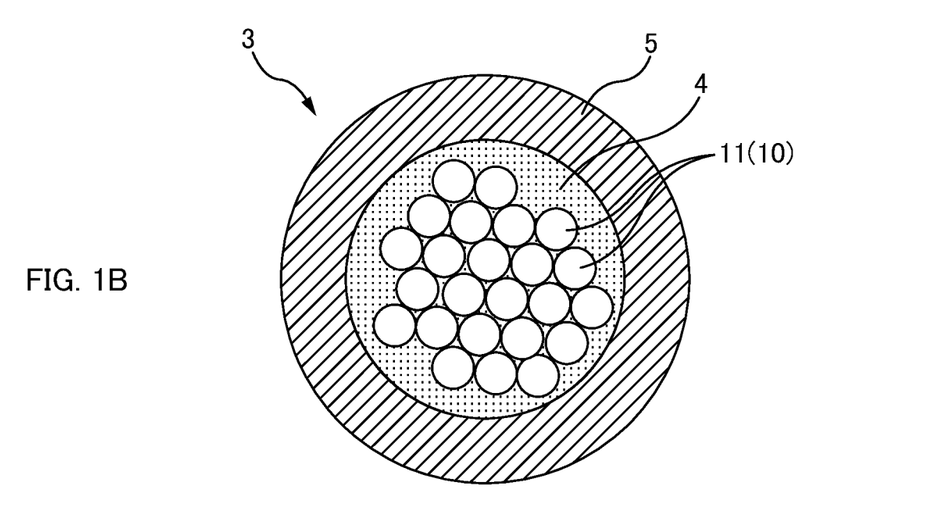
FIG. 1B is a cross-sectional view of a loose tube 3 according to one or more embodiments.

FIG. 1B is a cross-sectional view of a loose tube 3 according to one or more embodiments. An individual structure of the loose tube 3 may be herein referred to as an "optical cable" or a "loose-tube cable". The loose tube 3 contains a plurality of optical fibers 11, a filler material 4, and a tube 5. The filler material 4 is a waterproof material to fill spaces inside the tube 5 and to stop water coming into the tube 5, for example, a gel. The tube 5 is a tubular member that houses the plurality of optical fibers 11 and the filler material 4. The plurality of optical fibers 11 are constituted by one or a plurality of optical fiber ribbons 10 with discontinuous connections.

Figure 2:
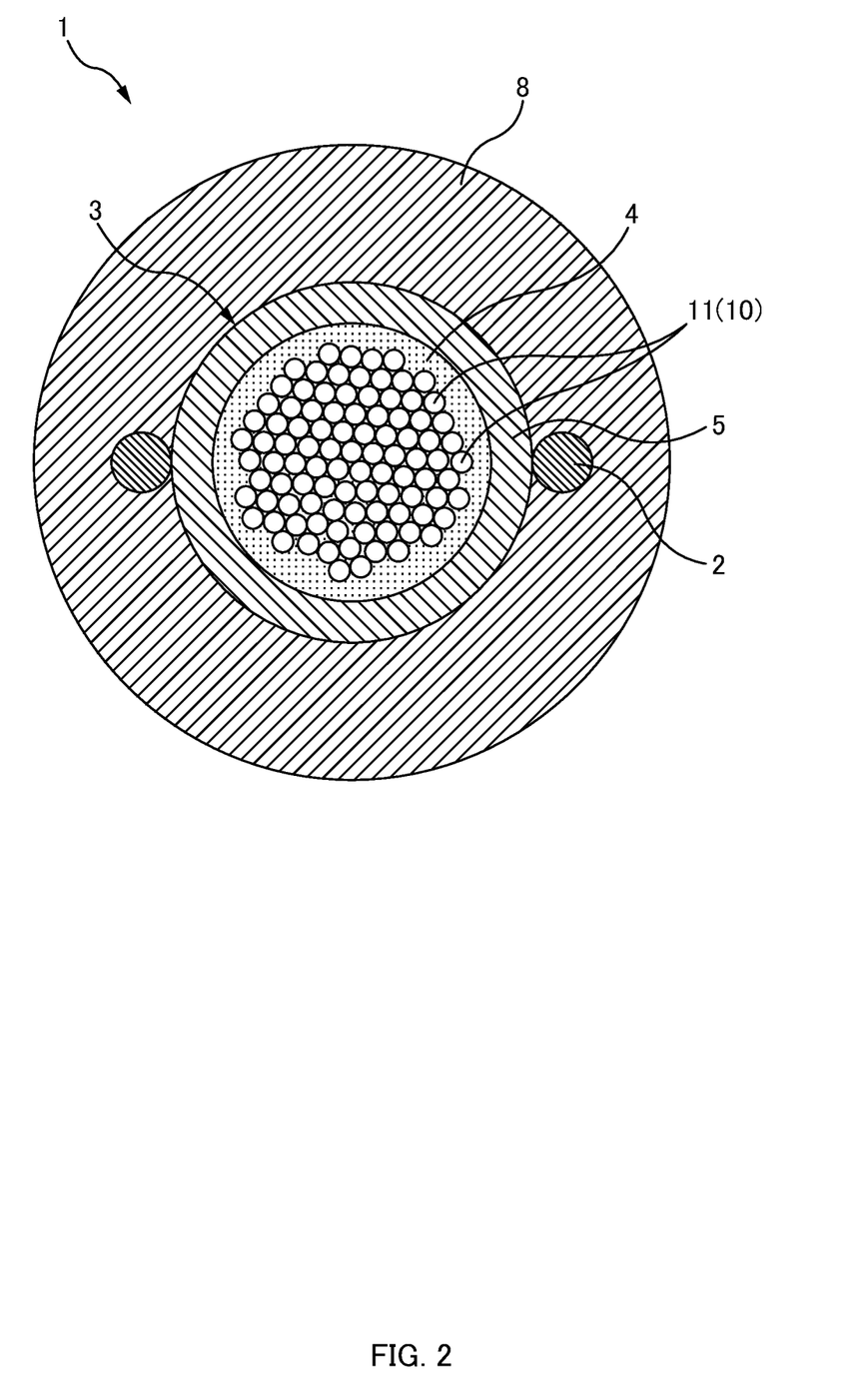
FIG. 2 is a cross-sectional view of another loose-tube-type optical cable 1 according to one or more embodiments.

FIG. 2 is a cross-sectional view of a loose-tube-type optical cable 1 of one or more embodiments. This loose-tube-type optical cable 1 includes two tension members 2 (tensile members), a loose tube 3, and a sheath 8. The optical cable 1 illustrated in FIG. 2 is also referred to as a center tube-type cable and the like. The loose tube 3 is arranged inside the sheath 8 so as to be disposed between the two tension members 2. Also in the optical cable 1 of FIG. 2, the loose tube 3 contains a plurality of optical fibers 11, a filler material 4, and a tube 5. The plurality of optical fibers 11 are constituted by one or a plurality of optical fiber ribbons 10 each having discontinuous connections. The tension members 2 are arranged longitudinally along the loose tube 3, and the sheath 8 is formed by extruding a sheath material around the tension members 2 and the loose tube 3, to thereby manufacture the loose-tube-type optical cable 1 illustrated in FIG. 2.

Figure 3A:
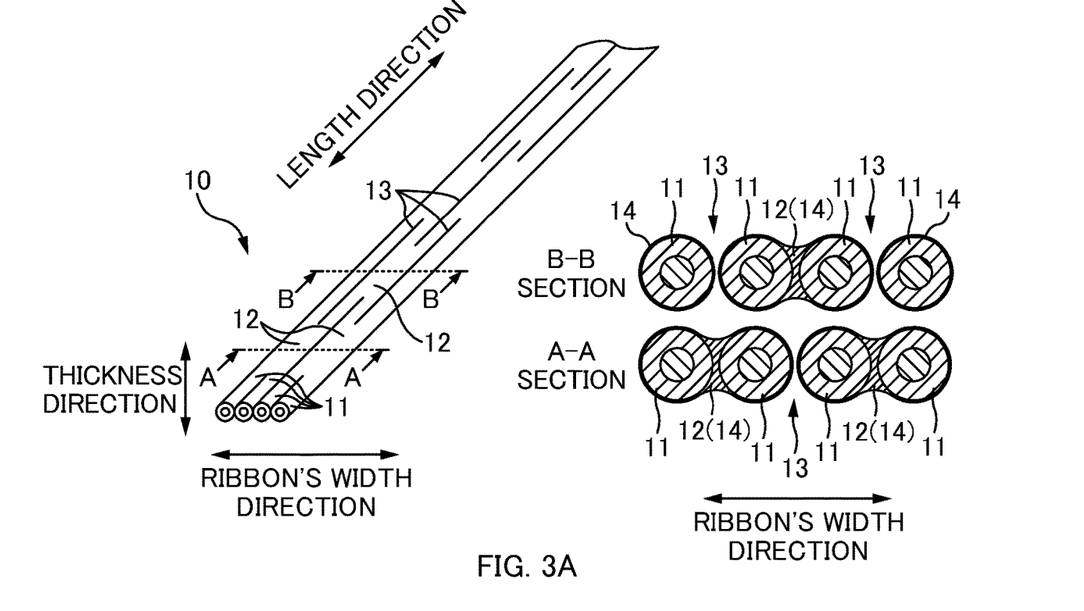
FIG. 3A is an explanatory view of an example of an optical fiber ribbon 10 with discontinuous connections.

FIG. 3A is an explanatory view of an example of an optical fiber ribbon 10 with discontinuous connections. In the below explanation, a direction parallel to the optical fibers 11 is referred to as a "length direction". A direction in which a plurality of optical fibers 11 constituting an optical fiber ribbon 10 with discontinuous connections are aligned is referred to as a "ribbon's width direction".

The optical fiber ribbon 10 with discontinuous connections is an optical fiber ribbon including a plurality of optical fibers 11 arranged side by side and connected at discontinuous parts. Two adjacent ones of the optical fibers 11 are connected with connection parts 12. A plurality of the connection parts 12 that connect two adjacent optical fibers 11 are arranged in a spaced-apart manner in the length direction. The plurality of connection parts 12 of the optical fiber ribbon 10 with discontinuous connections are arranged at certain intervals and two-dimensionally in the length direction and the ribbon's width direction. The connection parts 12 are formed by applying an ultraviolet cure resin to be an adhesive (connecting material 14) and then ultraviolet light is irradiated to cure the resin (described later). The connection parts 12 can also be made of thermoplastic resin. Regions other than the connection parts 12 between the two adjacent optical fibers 11 constitute non-connected parts 13 (separated parts). In the non-connected parts 13, the two adjacent optical fibers 11 are not restrained to each other. Thus, the optical fiber ribbon 10 with discontinuous connections can be rolled up into a tubular form (a bundle form), or folded up, and the multitude of optical fibers 11 can be housed with high density. Instead of the optical fiber ribbon 10 with discontinuous connections, however, a usual optical fiber ribbon 10 in which a plurality of optical fibers 11 arranged in the ribbon's width direction are covered all together may be used.

Figure 3B:
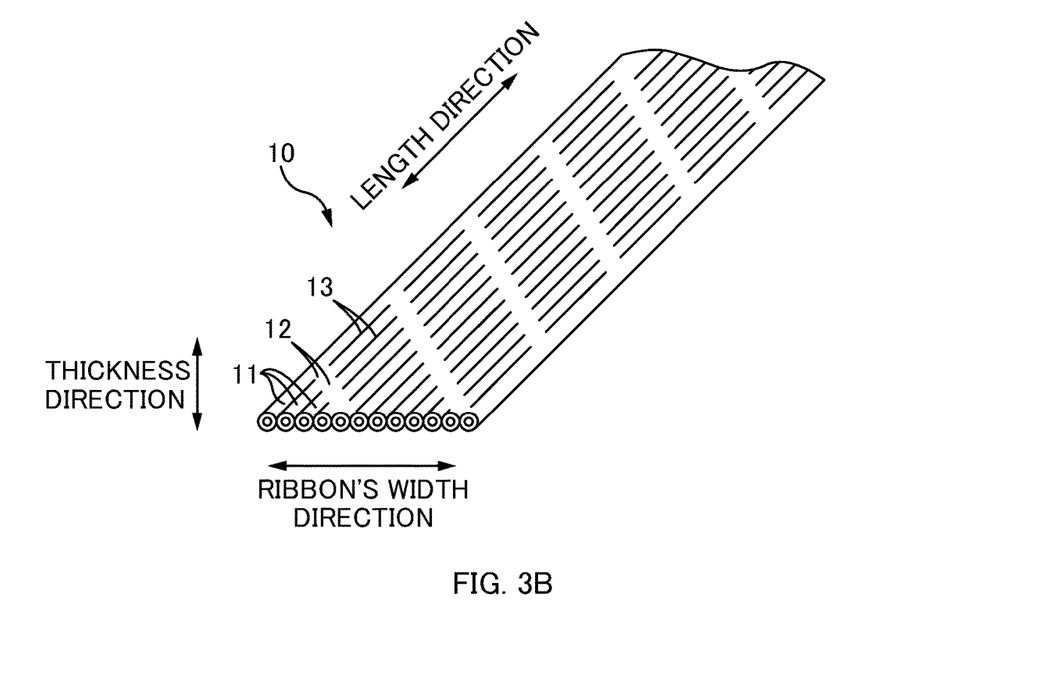
FIG. 3B is an explanatory view of another example of an optical fiber ribbon 10 with discontinuous connections.

FIG. 3B is an explanatory view of an example of an optical fiber ribbon 10 with discontinuous connections of one or more embodiments. In this way, the number of fibers of the optical fiber ribbon 10 with discontinuous connections may be changed appropriately. The arrangement of the connection parts 12 arranged at intervals may be changed appropriately.

Figure 4A:
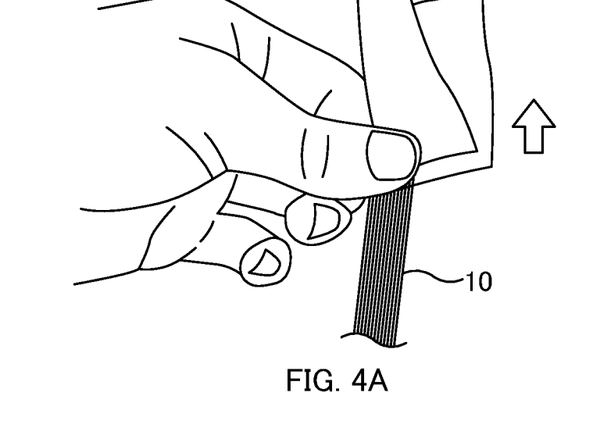
FIG. 4A is an explanatory view of wiping off filler material 4 attached to an optical fiber ribbon 10.

FIG. 4A is an explanatory view of wiping off the filler material 4 attached to the optical fiber ribbon 10. As shown in FIG. 4A, an operator takes out the optical fiber ribbon 10 with discontinuous connections from the loose tube 3 of the optical cable 1, and then wipes off the filler material 4 (for example, gel) attached to the optical fiber ribbon 10 with discontinuous connections with a cleaning sheet (for example, wiping paper). At this time, when fingers of the operator exert a force of twisting the optical fiber ribbon 10, the connection parts 12 of the optical fiber ribbon 10 with discontinuous connections may be destroyed. As a result, the optical fiber ribbon 10 with discontinuous connections is separated into individual optical fibers 11 (a plurality of the optical fibers 11 constituting the optical fiber ribbon 10 are separated into individually separated fibers). When the plurality of optical fibers 11 constituting the optical fiber ribbon 10 are separated into individual fibers, the plurality of optical fibers 11 of the optical fiber ribbon 10 cannot be easily combined by fusion all together. Thus, in order to fusion splice the optical fibers 11, it is necessary to fusion splice each of the individual optical fibers 11, or connect the plurality of optical fibers 11 that have been individually separated again into a ribbon shape and then fuse the fibers all together. This process takes a lot of time and effort. In order to avoid such time and effort, the connection parts 12 of the optical fiber ribbon 10 with discontinuous connections are not destroyed when wiping off the filler material 4 attached to the optical fiber ribbon 10.

Figure 4B:
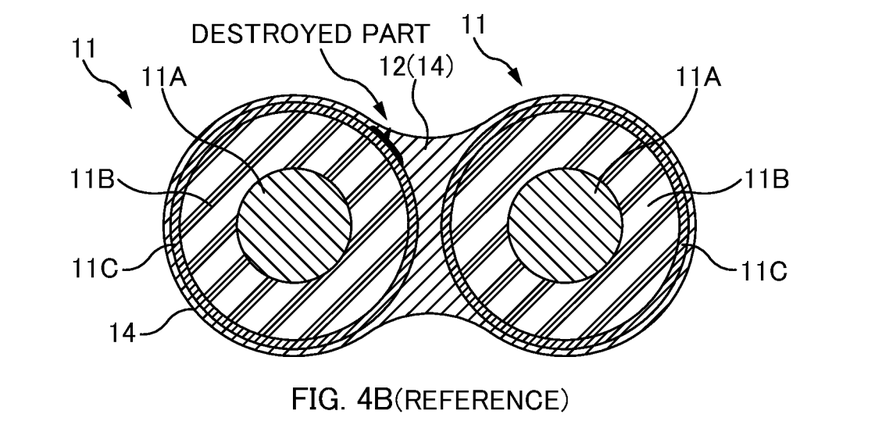
FIG. 4B is an explanatory view of a connection part 12 that has been destroyed in a reference example.
Figure 4C:
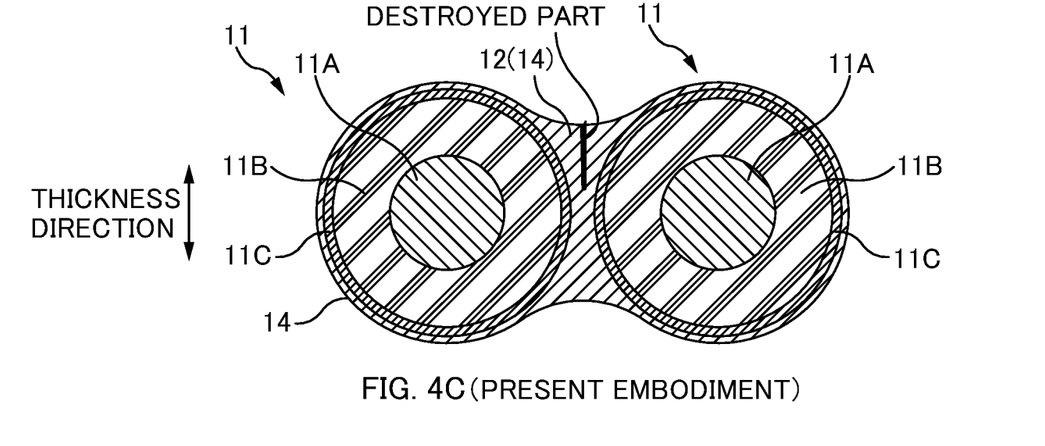
FIG. 4C is an explanatory view of a connection part 12 that has been destroyed in one or more embodiments.

FIG. 4B and FIG. 4C are cross-sectional views of the connection part 12 of two adjacent ones of the optical fibers 11 of the optical fiber ribbon 10 with discontinuous connections. FIG. 4B is an explanatory view of the connection part 12 that has been destroyed in the reference example. FIG. 4C is an explanatory view of the connection part 12 that has been destroyed in one or more embodiments.

As shown in FIG. 4B and FIG. 4C, the optical fiber 11 is configured from an optical fiber part 11A, a cover layer 11B, and a colored layer 11C. The optical fiber 11 is also referred to as a primary coated optical fiber or a secondary coated optical fiber. A diameter of the optical fiber 11 is approximately 250 µm. The optical fiber part 11A is configured from a core and a clad. The optical fiber part 11A is, for example, a quartz glass fiber. A diameter (clad diameter) of the optical fiber part 11A is, for example, approximately 125 µm. The cover layer 11B is a layer that coats the optical fiber part 11A. The cover layer 11B is configured from, for example, a primary cover layer (primary coating) and a secondary cover layer (secondary coating). The diameter of the cover layer 11B is, for example, approximately 240 µm. The colored layer 11C is a layer formed on a surface of the cover layer 11B. The colored layer 11C is formed by applying a coloring agent on a surface of the cover layer 11B. The coloring agent is usually colored, but may be colorless. As will be described later, the coloring agent is configured from an ultraviolet cure resin. As will be described later, the connection part 12 is formed by applying and curing the connecting material 14 (ultraviolet cure resin) on the surface of the colored layer 11C.

As shown in FIG. 4B, the resin configuring the connection part 12 on the colored layer 11C has been destroyed in the reference example. The reason that the connection part 12 is destroyed in such a part is not clear. A possibility is that peeling occurred in an interface between the colored layer 11C and the connection part 12 (see the part in a thick line in the interface in the figure), a thin resin layer of the connection part 12 broke from this peeling, and the connection part 12 was destroyed.

In one or more embodiments, by improving adhesiveness between the colored layer 11C and the connection part 12 as described below, it is achieved that peeling in the interface between the colored layer 11C and the connection part 12 does not easily occur. As a result, destruction in the thin resin layer of the connection part 12 is suppressed in one or more embodiments, and destruction in the connection part 12 advances with the colored layer 11C and the connection parts 12 still adhered together as shown in FIG. 4C, so that the connection part 12 is not easily destroyed compared to the reference example in FIG. 4B, and the optical fibers 11 can be suppressed from unintentionally being separated into single fibers. In one or more embodiments, when the connection parts 12 are split to separate the optical fibers 11 of the intermittently connected optical fiber ribbon 10 into single fibers, the connection parts 12 are destroyed with the colored layer 11C and the connection parts 12 still adhered together as shown in FIG. 4C, and in this way the optical fibers 11 are separated into single fibers.

On the other hand, in the case where adhesiveness between the colored layer 11C and the connection parts 12 is too high, when the connection parts 12 are split because the optical fibers 11 of the optical fiber ribbon 10 with discontinuous connections need to be separated into single fibers, the cover layer 11B as well as the connection parts 12 is destroyed, and there is a possibility that the optical fibers 11 are damaged. Further, when the Young's modulus and a breaking strength of the connection parts 12 is too high, the cover layer 11B as well as the connection parts 12 are destroyed, and there is a possibility that the optical fibers 11 are damaged. Thus, in one or more embodiments, the optical fiber ribbon 10 with discontinuous connections is manufactured by selecting a connecting material 14 with an appropriate Young's modulus and breaking strength and adjusting adhesiveness between the colored layer 11C and the connection part 12.

Figure 5:
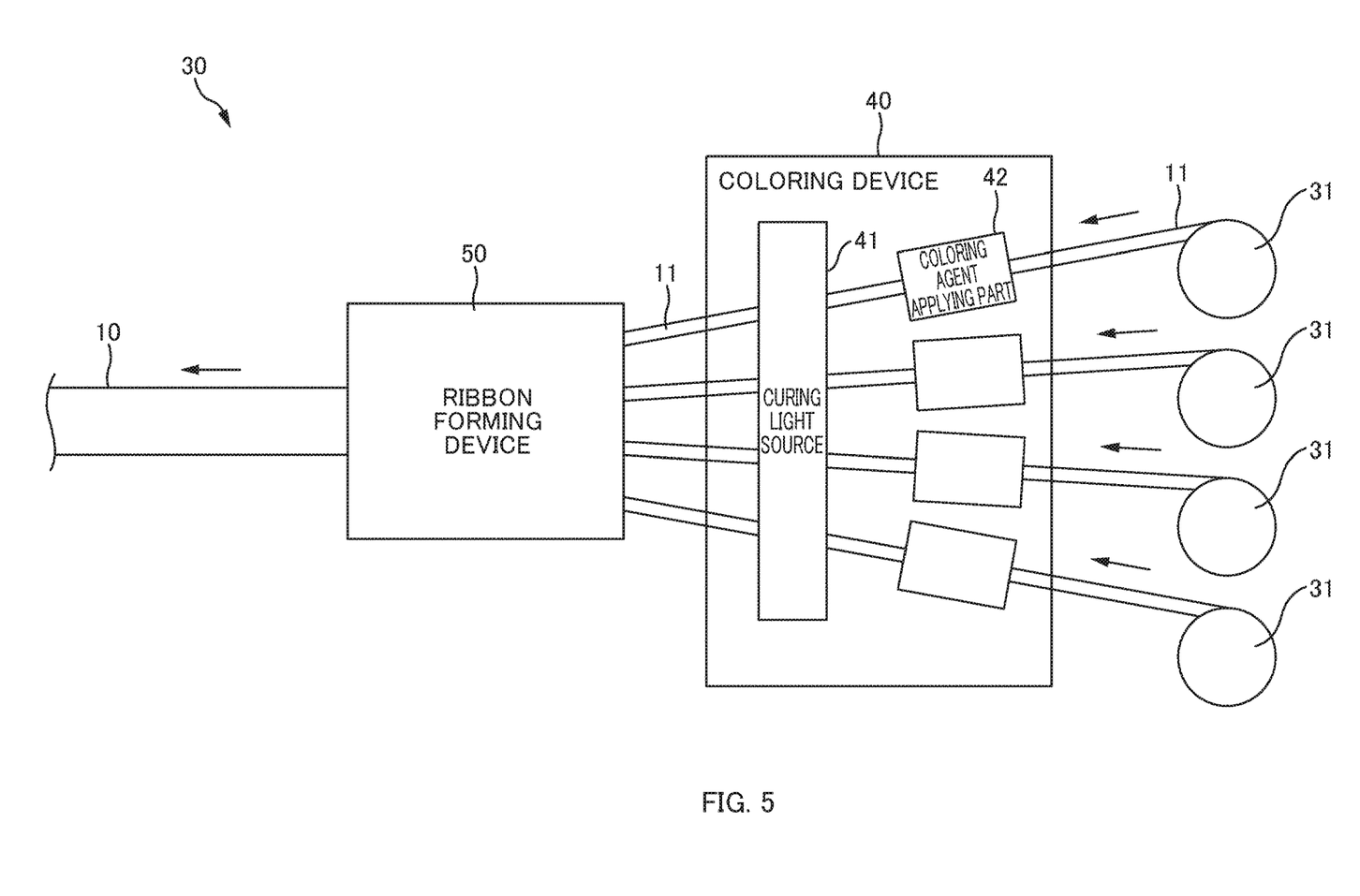
FIG. 5 is an explanatory view of a device 30 for manufacturing an optical fiber ribbon 10 with discontinuous connections according to one or more embodiments.

Method for Manufacturing Optical Fiber Ribbon 10 with Discontinuous Connections Summary of Method for Manufacturing Optical Fiber Ribbon 10 with Discontinuous Connections FIG. 5 is an explanatory view of a device 30 for manufacturing an optical fiber ribbon 10 with discontinuous connections of one or more embodiments. The device 30 for manufacturing has a plurality of fiber supply sources 31, a coloring device 40, and a ribbon forming device 50. Here, the number of the fiber supply sources is four.

The fiber supply sources 31 are supplying devices (supply sources) to supply optical fibers 11 to the coloring device 40. The optical fibers 11 to be supplied with the fiber supply sources 31 are optical fibers 11 that have not yet been formed with the colored layer 11C, i.e., optical fibers made of optical fiber part 11A and cover layer 11B.

The coloring device 40 is a device to form the colored layer 11C to the outer periphery of the cover layer 11B. The coloring device 40 forms the colored layer 11C in the entire circumferential surface of the cover layer 11B in the length direction of the optical fibers 11. The coloring device 40 includes a coloring agent applying part 41 and a curing light source 42. The coloring agent applying part 41 is an applying device to apply a coloring agent made of ultraviolet cure resin to the outer periphery of the cover layer 11B. The coloring agent applying part 41 applies the coloring agent to the entire circumferential surface of the cover layer 11B along the length direction of the optical fibers 11 by, for example, inserting the optical fibers 11 through a coating die filled with a liquid coloring agent. The curing light source 42 is a light source to irradiate ultraviolet light to the coloring agent made of ultraviolet cure resin. The coloring agent applied to the outer periphery of the cover layer 11B is irradiated with ultraviolet light of the curing light source 42 and is cured. The colored layer 11C is formed with the cured coloring agent. The coloring device 40 supplies the optical fibers 11 formed with the colored layer 11C to the ribbon forming device 50.

Figure 6A:
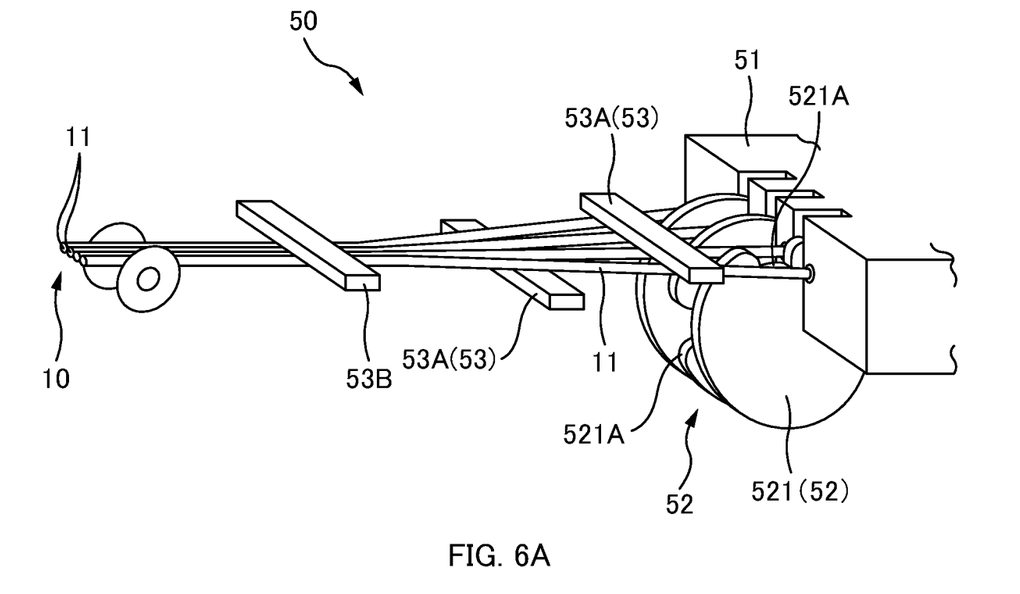
FIG. 6A and FIG. 6B are explanatory views of a ribbon forming device 50.
Figure 6B:
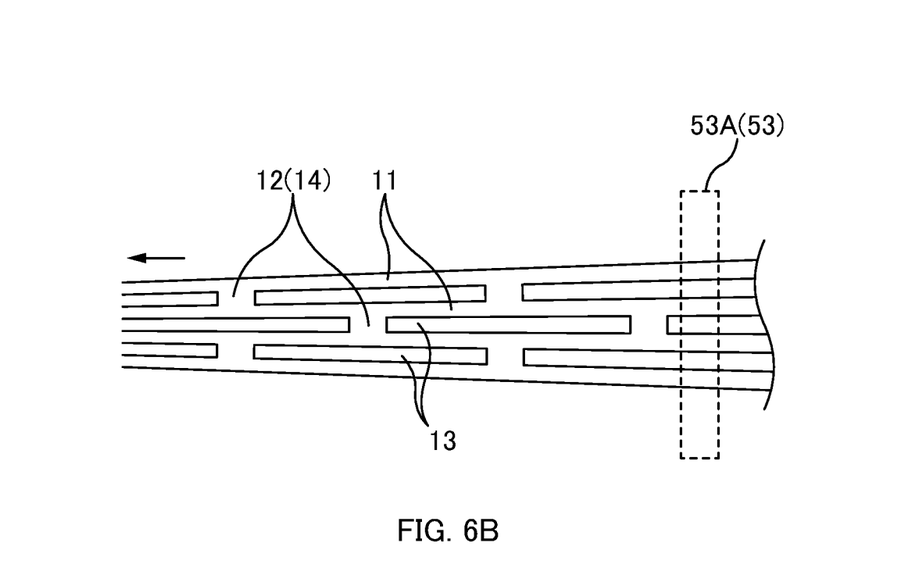

The ribbon forming device 50 is a device to form the connection parts 12 at certain intervals axially and to form the optical fiber ribbon 10 with discontinuous connections. FIG. 6A and FIG. 6B are explanatory views of the ribbon forming device 50. The ribbon forming device 50 has a connecting material applying part 51, a removing part 52, and a light source 53.

The connecting material applying part 51 is a device to apply a connecting material 14 made of the ultraviolet cure resin between the adjacent optical fibers 11. The connecting material applying part 51 applies the liquid connecting material 14 to the entire circumferential surface of the optical fibers 11 (entire circumferential surface of colored layer 11C) and between the optical fibers 11, along the length direction of the optical fibers 11, by inserting the plurality of optical fibers 11 through the coating die filled with the liquid connecting material 14. Here, the number of the optical fibers is four.

The removing part 52 is a device to remove a part of the liquid connecting material 14 applied between the optical fibers 11, while leaving a part of the liquid connecting material 14 on the optical fibers 11. The removing part 52 includes rotary blades 521 each having a recessed part 521A. See FIG. 6A. The removing part 52 makes the rotary blade 521 rotate in synchronism with a supplying speed of the optical fibers 11, and removes or cuts the connecting material 14 applied between the optical fibers 11 with an outer edge of the rotary blade 521 while leaving the connecting material 14 in the recessed part 521A of the rotary blade 521. In other words, the removing part 52 removes a part of the liquid connecting material 14 applied between the optical fibers 11 by scraping the connecting material 14 with the outer edge of the rotary blade 521.

The light source 53 is a light source to irradiate ultraviolet light to the connecting material 14 made of ultraviolet cure resin. The light source 53 has a preliminary curing light source 53A and a main curing light source 53B. The preliminary curing light source 53A irradiates ultraviolet light to preliminarily cure the connecting material 14. The temporarily cured connecting material 14 is not completely cured, but curing of the surface has advanced. The main curing light source 53B irradiates ultraviolet light more intense than the preliminary curing light source 53A to fully cure the connecting material 14. The fully cured ultraviolet cure resin is in a state cured to the inside (the optical fiber ribbon 10 with discontinuous connections, however, can be rolled into a tubular shape or folded, thus the fully cured connection parts 12 have appropriate elasticity).

As shown in FIG. 6B, the optical fibers 11 that have just come out the connecting material applying part 51 and the removing part 52 are arranged with a space between each other. The preliminary curing light source 53A irradiates ultraviolet light to the connecting material 14 in this state, and temporarily cures the connecting material 14. After preliminarily curing the connecting material 14, the ribbon forming device 50 gradually narrows the space between the optical fibers 11, aligns the plurality of the optical fibers 11 side by side, and gathers the optical fibers into a ribbon shape. Because the connecting material 14 has preliminarily cured, even when the parts from which the connecting material 14 has been removed (separated parts) contact each other, such parts do not have to be connected. Further, as it is before main curing, space between the optical fibers 11 can be narrowed (gathered) in a region connected with the connecting material 14. When the main curing light source 53B irradiates ultraviolet light to fully cure the connecting material 14, the optical fiber ribbon 10 with discontinuous connections shown in FIG. 3A is manufactured.

Forming of Colored Layer 11C and Connection Parts 12

In one or more embodiments, as already described above, by improving adhesiveness between the colored layer 11C and the connection parts 12, a structure in which peeling does not easily occur in an interface between the colored layer 11C and the connection parts 12 is achieved. See FIG. 4C. In one or more embodiments, to adjust a degree of adhesiveness between the colored layer 11C and the connection parts 12, the colored layer 11C and the connection parts 12 are formed as follows.

First, radical polymerizable ultraviolet cure resin is used as a coloring agent to form the colored layer 11C, oxygen concentration when forming the colored layer 11C is adjusted by adjusting oxygen concentration of the coloring device 40, and a degree of cure of the surface of the colored layer 11C is adjusted such that uncured resin is left on the surface of the colored layer 11C. When oxygen concentration of the coloring device 40 is increased, oxygen inhibition occurs on the surface of the coloring agent that is the radical polymerizable ultraviolet cure resin, thus uncured resin on the surface of the colored layer 11C increases, and the degree of cure of the surface of the colored layer 11C is lowered. Although uncured resin remains on the surface of the colored layer 11C, the inside of the colored layer 11C is cured, thus manufacturing of the optical fibers 11 becomes easier compared to the state where the inside of the colored layer 11C is uncured.

Figure 7:
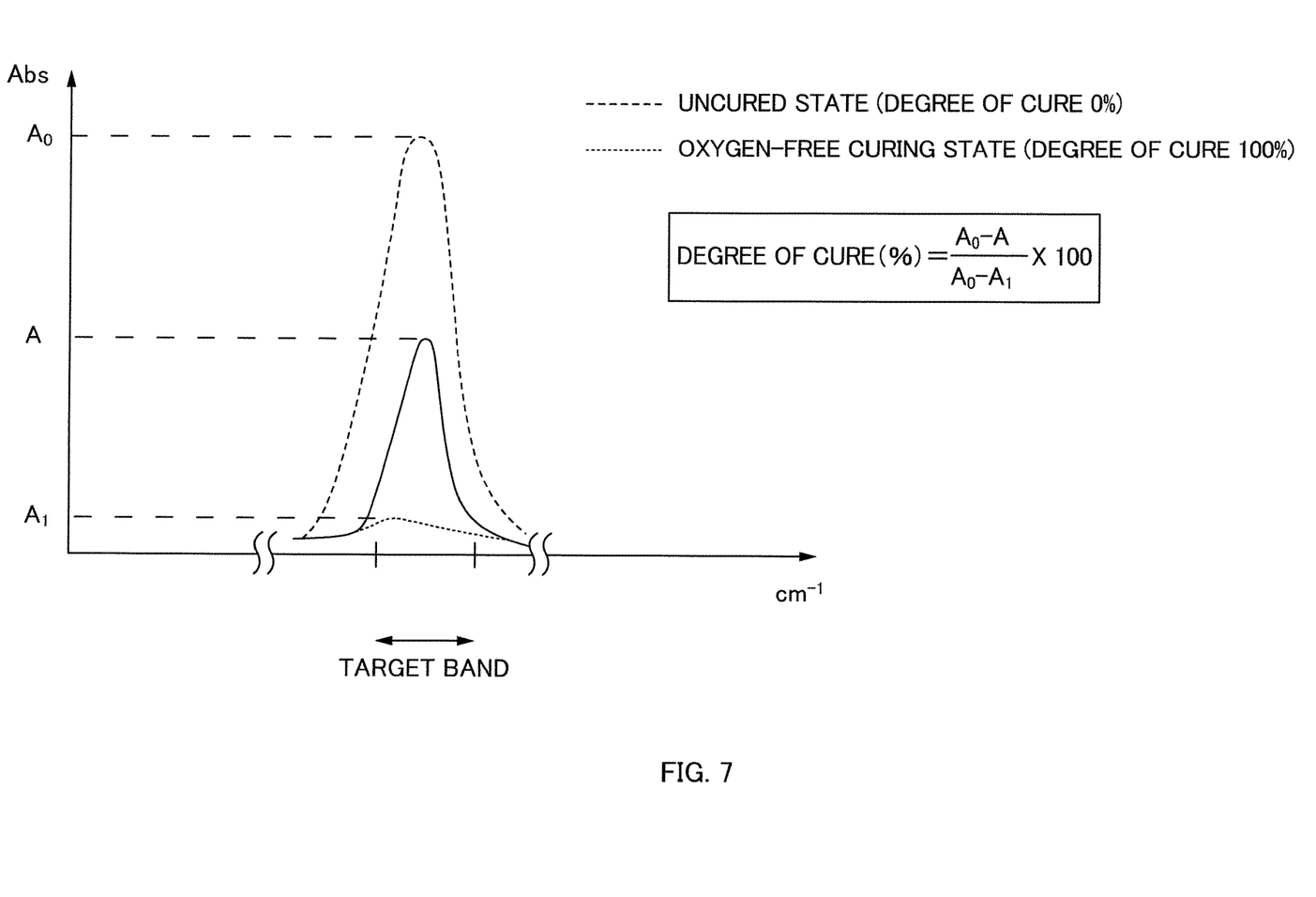
FIG. 7 is an explanatory view of degree of cure of a surface of a colored layer 11C.

FIG. 7 is an explanatory view of the degree of cure of a surface of the colored layer 11C. A graph in the figure shows measurement results of an infrared absorption spectrum. A horizontal axis in the graph shows a wave number ($cm^{-1}$), and a vertical axis shows absorbance. A peak intensity of a band of a double bond of a photopolymerization reaction of a coloring agent (ultraviolet cure resin) is measured, and this measurement value is A. For example, a band of CH out-of-plane bending vibration of a vinyl group is around 808 $cm^{-1}$. When a measurement value of a peak intensity of the colored layer 11C with a coloring agent in an uncured state is A0, and a measurement value of a peak intensity of the colored layer 11C with the colored layer 11C that is cured the most in an oxygen-free condition (oxygen concentration is lower than a measurement limit of 0.001%) is A1, the degree of cure of the surface of the colored layer 11C is calculated as follows.

degree of cure(%)={($A0-A$)/($A0-A1$)}×100

It should be noted that, the degree of cure of the surface of the colored layer 11C in an uncured state is 0%, and the degree of cure of the surface of the colored layer 11C when the coloring agent is cured in an oxygen-free condition (most cured state) is 100%. The oxygen concentration is measureable using an oximeter attached inside the coloring device 40.

In one or more embodiments, the colored layer 11C (before connection parts 12 are formed) is formed such that the degree of cure of the surface of the colored layer 11C is 60% to 90%. In the case where the degree of cure of the surface of the colored layer 11C is greater than 90%, peeling easily occurs in the interface between the colored layer 11C and the connection part 12 (refer to bold line part in interface in FIG. 4B), thus when wiping off the filler material 4 attached to the optical fiber ribbon 10 (refer to FIG. 4A), there is a possibility that the connection parts 12 are destroyed unintentionally. Further, in the case where the degree of cure of the surface of the colored layer 11C is less than 60%, adhesiveness between the colored layer 11C and the connection parts 12 is too high, and there is a possibility that the cover layer 11B is destroyed with the connection parts 12 when separating the optical fibers 11 of the optical fiber ribbon 10 with discontinuous connections into single fibers. On the contrary, when the degree of cure of the surface of the colored layer 11C is 60% to 90%, the connection parts 12 can be suppressed from being destroyed unintentionally, and also the cover layer 11B can be suppressed from being destroyed when separating the optical fibers 11 into single fibers, as described below.

In one or more embodiments, in order to make the degree of cure of the surface of the colored layer 11C to be 60% to 90%, the oxygen concentration when forming the colored layer 11C is adjusted to 0.10% to 1.0%. In the case where the oxygen concentration when forming the colored layer 11C is less than 0.10%, the degree of cure of the surface of the colored layer 11C becomes greater than 90% because the oxygen concentration is low, and as a result, when wiping off the filler material 4 attached to the optical fiber ribbon 10 (refer to FIG. 4A), there is a possibility that the connection parts 12 are unintentionally destroyed. Further, in the case where the oxygen concentration when forming the colored layer 11C is greater than 1.0%, adhesiveness between the colored layer 11C and the connection part 12 is too high, and there is a possibility that the cover layer 11B is destroyed also with the connection parts 12 when separating the optical fibers 11 of the optical fiber ribbon 10 with discontinuous connections into single fibers.

After forming the colored layer 11C by adjusting the degree of cure of the surface as described above, the ribbon forming device 50 forms the connection parts 12. In one or more embodiments, radical polymerizable ultraviolet cure resin is used also for the connecting material 14 forming the connection parts 12. As already described above, the ribbon forming device 50 applies liquid connecting material 14 to the entire circumferential surface of the colored layer 11C and between the optical fibers 11 with the connecting material applying part 51, removes a part of the liquid connecting material 14 applied between the optical fibers 11 with the removing part 52, and irradiates ultraviolet light to the connecting material 14 with the light source 53.

In one or more embodiments, the connecting material 14 which is the radical polymerizable ultraviolet cure resin is applied on the surface of the colored layer 11C with the uncured resin remaining, and ultraviolet light is irradiated on the connecting material 14. When the ultraviolet light is irradiated the photopolymerization initiator of the connecting material 14 becomes radical, and the connecting material 14 cures and forms the connection parts 12, and uncured resin on the surface of the colored layer 11C also cures. Thus, compared to the case where the connection parts 12 are formed on the colored layer 11C with the degree of cure of 100%, adhesiveness between the colored layer 11C and the connection parts 12 becomes high, and peeling in the interface between the colored layer 11C and the connection part 12 can be suppressed.

Further, in one or more embodiments, when applying the connecting material 14, the liquid connecting material 14 is applied to the entire circumferential surface of the colored layer 11C, thus a layer of the connecting material 14 is formed in the entire circumferential surface of the optical fiber 11 (refer to FIG. 4C). For this reason, the colored layer 11C is not exposed in the optical fiber ribbon 10 with discontinuous connections that has been completed, so that uncured resin does not have to be exposed. The uncured resin remains on the surface of the colored layer 11C when forming the colored layer 11C, but in the case where the liquid connecting material 14 is applied on the entire circumferential surface of the colored layer 11C, the uncured resin on the surface of the colored layer 11C is cured when forming the connection parts 12. Accordingly, even if the completed optical fiber ribbon 10 with discontinuous connections is analyzed, it is impossible or unrealistic to specify the characteristic of making uncured resin remain on the surface of the colored layer 11C when forming the colored layer 11C.

EXAMPLES

Example 1

A 12-fiber optical fiber ribbon 10 with discontinuous connections was manufactured with the above-described manufacturing method. A urethane acrylate based ultraviolet cure resin (resin A: Young's modulus of 800 MPa, breaking strength of 50 MPa) was used as the connecting material 14. By gradually adjusting the oxygen concentration when forming the colored layer 11C from a range of an oxygen-free condition (oxygen concentration is less than 0.001% of measurement limit) to 1.0%, the degree of cure of the surface of the colored layer 11C is gradually adjusted in a range of 100% to 60%. By measuring the peak intensity around 808 $cm^{-1}$ with FT-IR, the degree of cure of the surface of the colored layer 11C is measured.

A test to wipe off the gel adhered to the optical fiber ribbon 10 with discontinuous connections that has been manufactured is performed, to evaluate whether or not there is destruction in the connection parts 12 after wiping off the gel. A test to split the connection parts 12 of the optical fiber ribbon 10 with discontinuous connections and separate the optical fibers 11 into single fibers is performed, to evaluate also whether or not there is destruction in the cover layer 11B of the optical fiber 11 after being separated into a single fiber (after the connection parts 12 have been split).

The experiment results of Example 1 are shown in Table 1 below.

TABLE 1

| Sample number | Connecting material | Young's modulus [MPa] | Breaking strength [MPa] | Oxygen concentration when forming colored layer | Degree of cure of surface of colored layer | Destruction in connection part after wiping | Destruction in cover layer of optical fiber separated into single fiber |
|---|---|---|---|---|---|---|---|
| A1 | Resin A | 800 | 50 | 1.0% | 60% | No | Yes |
| A2 | | | | 0.30% | 85% | No | Yes |
| A3 | | | | 0.10% | 90% | No | Yes |
| A4 | | | | 0.03% | 94% | Yes | Yes |
| A5 | | | | 0.01% | 96% | Yes | Yes |
| A6 | | | | 0.003% | 99% | Yes | Yes |
| A7 | | | | less than 0.001% | 100% | Yes | Yes |

As shown in evaluation results of "whether or not there is destruction in connection part after wiping" of sample numbers A1 to A3, as long as the degree of cure of the surface of the colored layer 11C is equal to or smaller than 90% (equal to or greater than 60%), destruction in the connection part 12 when wiping off the gel can be suppressed. In other words, as long as the oxygen concentration when forming the colored layer 11C is equal to or greater than 0.10% (equal to or smaller than 1.0%), destruction in the connection part 12 when wiping off the gel can be suppressed. On the other hand, as shown in the evaluation results of sample numbers A4 to A7, in the case where the degree of cure of the surface of the colored layer 11C is equal to or greater than 94% (in the case where the oxygen concentration when forming the colored layer 11C is equal to or smaller than 0.03%), the connection part 12 was destroyed when wiping off the gel. The reason of the above is considered that peeling was likely to occur in the interface between the colored layer 11C and the connection part 12.

In Example 1, the cover layer 11B of the optical fiber 11 that has been separated into single fibers had been destroyed in all of the samples (sample numbers A1 to A7). The reason of this result is considered that the Young's modulus and the breaking strength of the connection part 12 formed with resin A was high.

It is to be noted that in the case where connection part 12 is formed with resin A, the effect of suppressing destruction in the connection part 12 that has been wiped can be achieved, as described above.

Example 2

A 12-fiber optical fiber ribbon 10 with discontinuous connections was manufactured similar to Example 1 using a different resin (connecting material 14) for forming the connection parts 12 from that in Example 1. The Young's modulus and breaking strength of resin B to resin F are shown in Table 2. Further, as similar to Example 1, evaluation of whether or not there is destruction in the connection part 12 from which the gel has been wiped off, and evaluation of whether or not there is destruction in the cover layer 11B of the optical fiber 11 that has been separated into single fibers are performed. In the case where there is no destruction in the connection part 12 from which the gel has been wiped off, and there was no destruction in the cover layer 11B of the optical fiber 11 that has been separated into a single fiber, the result was determined "satisfactory", and in the case where there was destruction in at least one of the above, the result was determined "non-satisfactory". The experiment results of Example 2 are shown in Table 2 below.

TABLE 2

| Sample number | Connecting material | Young's modulus [MPa] | Breaking strength [MPa] | Oxygen concentration when forming colored layer | Degree of cure of surface of colored layer | Thickness of connection part [μm] | Destruction in connection part after wiping | Destruction in cover layer of optical fiber individually separated | Determination |
|---|---|---|---|---|---|---|---|---|---|
| B1 | Resin B | 300 | 30 | 3.0% | 58% | 120 | No | Yes | x |
| B2 | | | | 1.0% | 60% | 150 | No | No | o |
| B3 | | | | | | 200 | No | No | o |
| B4 | | | | 0.30% | 85% | 150 | No | No | o |
| B5 | | | | 0.10% | 90% | 150 | No | No | o |
| B6 | | | | 0.01% | 94% | 150 | Yes | No | x |
| C1 | Resin C | 200 | 25 | 3.0% | 58% | 120 | No | Yes | x |
| C2 | | | | 1.0% | 60% | 150 | No | No | o |
| C3 | | | | | | 200 | No | No | o |
| C4 | | | | 0.1% | 90% | 150 | No | No | o |
| C5 | | | | | | 200 | No | No | o |
| C6 | | | | 0.01% | 94% | 200 | Yes | No | x |
| D1 | Resin D | 60 | 12 | 3.0% | 58% | 150 | No | Yes | x |
| D2 | | | | 1.0% | 60% | 150 | No | No | o |
| D3 | | | | 0.10% | 90% | 150 | No | No | o |
| D4 | | | | 0.01% | 94% | 150 | Yes | No | x |
| E1 | Resin E | 10 | 10 | 3.0% | 58% | 150 | No | Yes | o |
| E2 | | | | 1.0% | 60% | 150 | No | No | o |
| E3 | | | | 0.10% | 90% | 150 | No | No | o |
| E4 | | | | 0.01% | 94% | 150 | Yes | No | x |
| F1 | Resin F | 5 | 5 | 3.0% | 58% | 150 | Yes | No | x | o: satisfactory  
x: unsatisfactory

It is also confirmed that in the case where the connection part 12 is formed with resin B to resin E, when the colored layer 11C is formed with the degree of cure of the surface of the colored layer 11C 60% to 90% (oxygen concentration of when forming colored layer 11C is 0.10% to 1.0%), destruction of the connection part 12 when wiping the gel can be suppressed.

In the case where the colored layer 11C is formed with the degree of cure of the surface of the colored layer 11C within a range of 60% to 90%, and the connection part 12 is formed with resin B to resin E with the Young's modulus of 10 to 300 MPa and the breaking strength of 10 to 30 MPa, then not only can destruction in the connection part 12 when wiping off the gel be suppressed, but also destruction in the cover layer 11B of the optical fiber 11 that has been separated into a single fiber can also be suppressed. On the contrary, in the case where the connection part 12 is formed with the above-described resin A, the cover layer 11B of the optical fiber 11 that has been separated into a single fiber was destroyed. Thus, the resin that forms the connection part 12 has the Young's modulus of 10 to 300 MPa and the breaking strength of 10 to 30 MPa.

With resin B to resin E, in the case where the degree of cure of the surface of the colored layer 11C is equal to or greater than 94% (in the case where oxygen concentration when forming colored layer 11C is equal to or smaller than 0.030), the connection part 12 is destroyed when wiping the gel. The reason of this result is considered that peeling was likely to occur in the interface between the colored layer 11C and the connection part 12. In the case where the degree of cure of the surface of the colored layer 11C is equal to or smaller than 58% (in the case where oxygen concentration when forming colored layer 11C is equal to or greater than 3.0%), the cover layer 11B of the optical fiber 11 after being separated into a single fiber was destroyed. The reason is considered that the adhesiveness between the colored layer 11C and the connection part 12 was too high.

Example 3

A 12-fiber optical fiber ribbon 10 with discontinuous connections is manufactured similarly to Examples 1, 2 with a varying thickness of the connection part 12 (size in thickness direction in FIG. 4C). The colored layer 11C is formed with the degree of cure of the surface of the colored layer 11C 60% to 90%, and the connection part 12 is formed with resin B to resin E having the Young's modulus of 10 to 300 MPa and the breaking strength of 10 to 30 MPa. Similar to Examples 1 and 2, evaluation of whether or not there is destruction in the connection part 12 from which the gel has been wiped off, and evaluation of whether or not there is destruction in the cover layer 11B of the optical fiber 11 that has been separated into a single fiber is performed. Experiment results of Example 3 are shown in Table 3 below.

TABLE 3

| Connecting material | Oxygen concentration when forming colored layer | Degree of cure of surface of colored layer | Thickness of connection part [μm] | Destruction in connection part after wiping | Destruction in cover layer of optical fiber separated into single fiber | Determination |
|---|---|---|---|---|---|---|
| Resin B | 1.0% | 60% | 120 | Yes | No | x |
|  |  |  | 150 | No | No | o |
|  |  |  | 200 | No | No | o |
|  | 0.30% | 85% | 120 | Yes | No | x |
|  |  |  | 150 | No | No | o |
|  | 0.10% | 90% | 120 | Yes | No | x |
|  |  |  | 150 | No | No | o |
| Resin C | 1.0% | 60% | 120 | Yes | No | x |
|  |  |  | 150 | No | No | o |
|  |  |  | 200 | No | No | o |
|  | 0.1% | 90% | 120 | Yes | No | x |
|  |  |  | 150 | No | No | o |
|  |  |  | 200 | No | No | o |
| Resin D | 1.0% | 60% | 120 | Yes | No | x |
|  |  |  | 150 | No | No | o |
|  | 0.30% | 85% | 50 | Yes | No | x |
|  |  |  | 120 | Yes | No | x |
|  |  |  | 150 | No | No | o |
|  |  |  | 220 | No | No | o |
|  |  |  | 300 | No | No | o |
|  | 0.10% | 90% | 120 | Yes | No | x |
|  |  |  | 150 | No | No | o |
| Resin E | 1.0% | 60% | 120 | Yes | No | x |
|  |  |  | 150 | No | No | o |
|  | 0.10% | 90% | 120 | Yes | No | x |
|  |  |  | 150 | No | No | o | o: satisfactory
x: unsatisfactory

In the case where the thickness of the connection part 12 is equal to or smaller than 120 μm, the connection part 12 after wiping off of the gel was destroyed. On the other hand, in the case where the thickness of the connection part 12 is equal to or greater than 150 μm, destruction of the connection part 12 after wiping off of the gel can be suppressed. Even when the thickness of the connection part 12 is equal to or greater than 150 μm, the cover layer 11B of the optical fiber 11 that has been separated into a single fiber has not been destroyed. From the above, the thickness of the connection part 12 is equal to or greater than 150 μm.

Figure 8A:
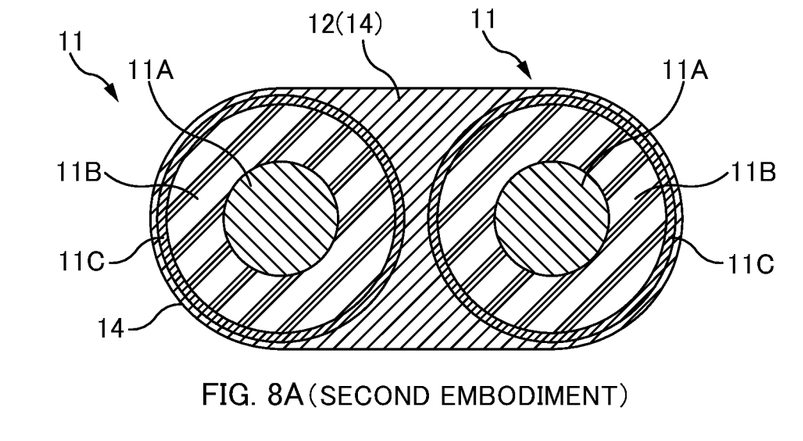
FIG. 8A is a cross-sectional view of a connection part 12 of two adjacent ones of the optical fibers 11 of an optical fiber ribbon 10 with discontinuous connections according to one or more embodiments.

FIG. 8A is a cross-sectional view of a connection part 12 of adjacent 2-fiber optical fibers 11 of an optical fiber ribbon 10 with discontinuous connections according to one or more embodiments. As shown in one or more embodiments, the connection part 12 may be configured such that the thickness (size in thickness direction) of the connection part 12 is uniform.

Again in one or more embodiments, when applying the connecting material 14, the liquid connecting material 14 is applied to the entire circumferential surface of the colored layer 11C, and in this way, a layer of the connecting material 14 is formed to the entire circumferential surface of the optical fiber 11. Thus, in one or more embodiments, the colored layer 11C is not exposed, and thus uncured resin does not have to be exposed.

Figure 8B:
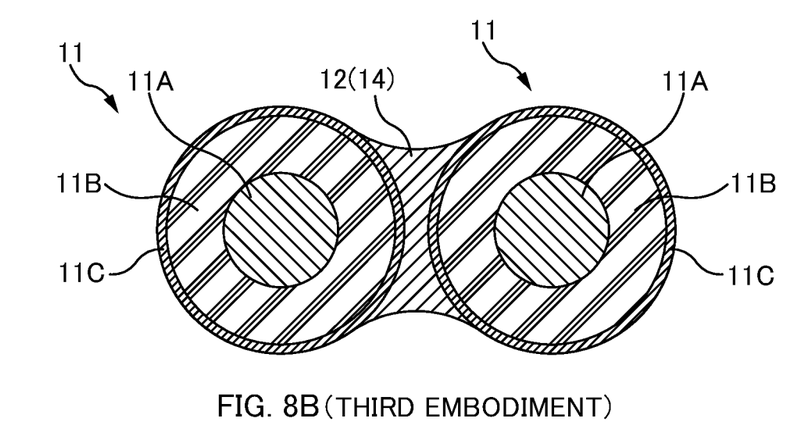
FIG. 8B is a cross-sectional view of a connection part 12 of two adjacent ones of the optical fibers 11 of an optical fiber ribbon 10 with discontinuous connections according to one or more embodiments.

FIG. 8B is a cross-sectional view of a connection part 12 of adjacent 2-fiber optical fibers 11 of an optical fiber ribbon 10 with discontinuous connections in one or more embodiments. As shown in one or more embodiments, the connection part 12 may be formed only in between the optical fibers 11.

Figure 8C:
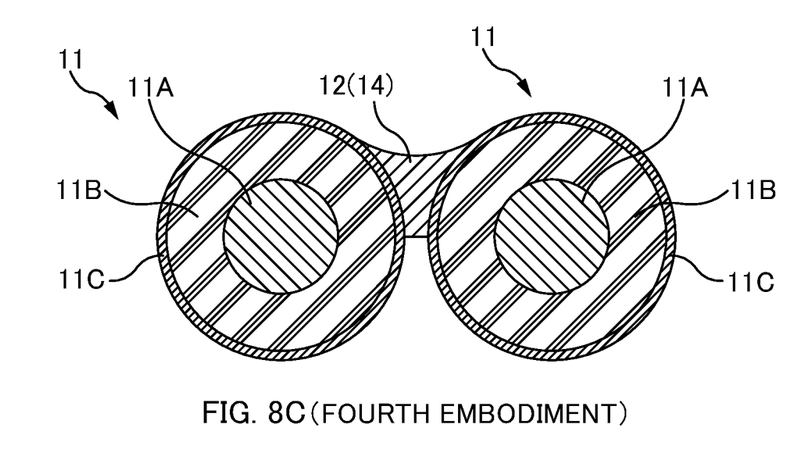
FIG. 8C is a cross-sectional view of a connection part 12 of two adjacent ones of the optical fibers 11 of an optical fiber ribbon 10 with discontinuous connections according to one or more embodiments.

FIG. 8C is a cross-sectional view of a connection part 12 of adjacent 2-fiber optical fibers 11 of an optical fiber ribbon 10 with discontinuous connections in one or more embodiments. As shown in one or more embodiments, the connection part 12 is not formed equally in the thickness direction, and the connection part 12 may be formed as displaced to one side in the thickness direction (upper side in the figure).

In the one or more embodiments, the connecting material 14 is applied only partially to the periphery of the optical fiber 11. Thus, in one or more embodiments, the colored layer 11C will be exposed even after the optical fiber ribbon 10 with discontinuous connections has been completed. Because the connecting material 14 is not applied to the exposed section of the colored layer 11C, uncured resin will remain on the surface of the colored layer 11C of this section even after the optical fiber ribbon 10 with discontinuous connections has been completed. With the configuration of the connection part 12 in one or more embodiments, however, the connecting material 14 does not have to be applied to the entire circumferential surface of the optical fiber 11, thus for example, a method to eject the connecting material 14 toward the optical fiber 11 can be adopted, and there is an advantage that a degree of freedom in the application method of the connecting material 14 increases.

When manufacturing the optical fiber ribbon 10 with discontinuous connections, similar to the above-described embodiments, radical polymerizable ultraviolet cure resin is used as a coloring agent to form the colored layer 11C, the oxygen concentration when forming the colored layer 11C is adjusted by adjusting oxygen concentration of the coloring device 40, and the degree of cure of the surface of the colored layer 11C is adjusted such that uncured resin remains on the surface of the colored layer 11C. At this time, the colored layer 11C (before the connection part 12 is formed) is formed such that the degree of cure of the surface of the colored layer 11C is 60% to 90%. Then, the optical fiber ribbon 10 with discontinuous connections is manufactured by applying the connecting material 14 that is the radical polymerizable ultraviolet cure resin to the surface of the colored layer 11C on which uncured resin remains, and irradiating ultraviolet light to the connecting material 14 to form the connection part 12. In this way, the adhesiveness between the colored layer 11C and the connection part 12 can be improved, and destruction of the connection part 12 when wiping off the gel can be suppressed.

By the way, in one or more embodiments, the degree of cure of the surface of the colored layer 11C is adjusted such that uncured resin remains on the surface of the colored layer 11C by adjusting the oxygen concentration when forming the colored layer 11C. Instead of adjusting the oxygen concentration, however, by adjusting the intensity of the ultraviolet light that irradiate the coloring agent, the degree of cure of the surface of the colored layer 11C may be adjusted such that uncured resin remains on the surface of the colored layer 11C. When the intensity of the ultraviolet light that irradiates the coloring agent is weakened, however, the inside of the colored layer 11C becomes an uncured and soft state, thus manufacturing of the optical fiber 11 (colored fiber) becomes difficult. On the contrary, with the method of adjusting the oxygen concentration when forming the colored layer 11C, uncured resin merely remains on the surface of the colored layer 11C, and there is an advantage that manufacturing of the optical fiber 11 (colored fiber) becomes easy. In the case that the intensity of the ultraviolet light to irradiate on the coloring agent is weakened such that uncured resin remains on the surface of the colored layer 11C, the colored layer 11C is formed such that the degree of cure of the surface of the colored layer 11C is 60% to 90%.

Other Points

The above embodiments are to facilitate understanding of the present invention, and do not limit the present invention. This invention may be changed and modified without departing from the gist thereof, and it is needless to say that this invention includes its equivalents.

REFERENCE SIGNS LIST 1 loose-tube-type optical cable, 2 tension member,
3 loose tube, 4 filler material (water-flow prevention material, gel),
5 tube, 7 wrapping tape, 8 sheath,
10 optical fiber ribbon with discontinuous connections,
11 optical fiber, 11A optical fiber part,
11B cover layer, 11C colored layer,
connection part, 13 non-connected part, 14 connecting material,
30 manufacturing device, 31 fiber supply source,
40 coloring device, 41 coloring agent applying part, 42 curing light source,
50 ribbon forming device, 51 connecting material applying part,
52 removing part, 521 rotary blade, 521A recessed part,
53 light source, 53A preliminary curing light source, 53B main curing light source Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for manufacturing an intermittently connected optical fiber ribbon comprising:
   forming a colored layer on to each of a plurality of optical fibers; and
   forming an intermittently connected optical fiber ribbon by curing a connecting material applied to a surface of the colored layer of each of the optical fibers to form connection parts that intermittently connect adjacent ones of the optical fibers, wherein
   forming the colored layer comprises:
      applying a coloring agent to the optical fibers; and
      curing the coloring agent such that uncured resin remains on the surface of the colored layer, and forming the optical fiber ribbon comprises:
applying the connecting material between the optical fibers and on the entire circumferential surface of the optical fibers, wherein the optical fibers each have the colored layer formed thereon, and the uncured resin remains on the surface of the colored layer;
removing a part of the connecting material applied between the optical fibers while keeping a part of the connecting material remaining between the optical fibers;
curing the connecting material and the uncured resin on the surface of the colored layer by irradiating the connecting material with ultraviolet light; and
intermittently forming the connection parts at discontinuous parts, wherein sections where the connecting material has remained between the optical fibers and has been cured become the connection parts whereas sections where the connecting material has been removed from between the optical fibers become separated parts that do not restrain the adjacent optical fibers to each other.

2. The method for manufacturing an optical fiber ribbon according to claim 1, wherein
forming the colored layer further comprises:
applying the coloring agent to the optical fibers, wherein the coloring agent is made of radical polymerizable ultraviolet cure resin, and
irradiating ultraviolet light to the coloring agent while making the uncured resin remain on the surface of the colored layer with oxygen inhibition, and
forming the optical fiber ribbon further comprises:
applying the connecting material to the surface of the colored layer where the uncured resin remains, wherein the connecting material is made of radical polymerizable ultraviolet cure resin, and
by irradiating ultraviolet light to the connecting material, curing the connecting material and the uncured resin on the surface of the colored layer.

3. The method for manufacturing an optical fiber ribbon according to claim 2, wherein forming the optical fiber ribbon further comprises:
applying the connecting material to an entire circumferential surface of the optical fibers wherein the optical fibers are each formed with the colored layer, and
by irradiating ultraviolet light to the connecting material, curing the connecting material applied to the entire circumference of the optical fibers and the uncured resin on the surface of the colored layer.

4. The method for manufacturing an optical fiber ribbon according to claim 2, wherein forming the colored layer further comprises:
in an atmosphere with an oxygen concentration of 0.10% to 1.0% and while making the uncured resin remain on the surface with oxygen inhibition, irradiating the coloring agent with ultraviolet light.

5. The method for manufacturing an optical fiber ribbon according to claim 1, wherein the colored layer is formed such that a degree of cure is 60% to 90% when:
a peak intensity of a band of a double bond of a photopolymerization reaction when measuring the surface of the colored layer with infrared absorption spectrum is A,
the peak intensity when the coloring agent is uncured is A0,
the peak intensity when the coloring agent is cured the most is A1, and
the degree of cure of the surface of the colored layer is represented by: degree of cure(%)={(A0−A)/(A0−A1)}×100.

6. The method for manufacturing an optical fiber ribbon according to claim 1, wherein a Young's modulus of the connecting material is 10 to 300 MPa and a breaking strength of the connecting material is 10 to 30 MPa.

7. The method for manufacturing an optical fiber ribbon according to claim 1, wherein a thickness of the connection part is equal to or greater than 150 µm.

8. An intermittently connected optical fiber ribbon comprising:
a plurality of optical fibers each having a colored layer, the plurality of optical fibers being arranged side by side;
connection parts intermittently connecting two fibers of the optical fibers adjacent to each other; and
separated parts where the two adjacent optical fibers are not restrained to each other, wherein:
the colored layer is formed by curing a coloring agent such that uncured resin remains on a surface of the colored layer,
a connecting material is applied to the surface of the colored layer with the uncured resin remaining thereon, wherein the connecting material is applied between the optical fibers and on the entire circumferential surface of the optical fibers, and a part of the connecting material applied between the optical fibers is removed while keeping a part of the connecting material remaining between the optical fibers,
the connection parts are formed intermittently by curing the connecting material remaining between the optical fibers,
the separated parts are formed in sections where the connecting material has been removed from between the optical fibers, and
the uncured resin on the surface of the colored layer is cured when the connecting material is cured.

9. The optical fiber ribbon according to claim 8, wherein when the connection parts are split to separate the optical fibers into single fibers, the connection parts are destroyed with the colored layer and the connection parts still attached.

10. The optical fiber ribbon according to claim 9, wherein when each of the connection parts is split, each of the connection parts is destroyed without a cover layer below the colored layer being destroyed.

11. The optical fiber ribbon according to claim 8, wherein the colored layer is formed such that a degree of cure is 60% to 90% when:
a peak intensity of a band of a double bond of a photopolymerization reaction when measuring the surface of the colored layer with infrared absorption spectrum is A,
the peak intensity when the coloring agent is uncured is A0,
the peak intensity when the coloring agent has cured the most is A1, and the degree of cure of the surface of the colored layer is represented by: degree of cure(%)={(A0−A)/(A0−A1)}×100.

12. The optical fiber ribbon according to claim 8, wherein a Young's modulus of the connecting material is 10 to 300 MPa and a breaking strength of the connecting material is 10 to 30 MPa.

13. An optical cable comprising:
a plurality of optical fibers each having a colored layer and arranged side by side, an intermittently connected optical fiber ribbon having connection parts that intermittently connect two fibers of the optical fibers adjacent to each other and separated parts where the two adjacent optical fibers are not restrained to each other;
a tube that houses the optical fiber ribbon; and
a filler material that fills the tube, wherein:
the colored layer is formed by curing a coloring agent such that uncured resin remains on a surface of the colored layer,
a connecting material is applied on the surface of the colored layer with the uncured resin remaining thereon, wherein the connecting material is applied between the optical fibers and on the entire circumferential surface of the optical fibers, and a part of the connecting material applied between the optical fibers is removed while keeping a part of the connecting material remaining between the optical fibers,
the connection parts are formed intermittently by curing the connecting material remaining between the optical fibers,
the separated parts are formed in sections where the connecting material has been removed from between the optical fibers, and
the uncured resin on the surface of the colored layer is cured when the connecting material is cured.

* * * * *